United States Patent
Bataller et al.

(10) Patent No.: US 10,354,144 B2
(45) Date of Patent: Jul. 16, 2019

(54) VIDEO CAMERA SCENE TRANSLATION

(71) Applicant: Accenture Global Solutions Limited, Dublin (IE)

(72) Inventors: Cyrille Bataller, Mougins (FR); Anders Astrom, Singapore (SG); Philippe Daniel, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/169,111

(22) Filed: May 31, 2016

(65) Prior Publication Data

US 2016/0350599 A1 Dec. 1, 2016

Related U.S. Application Data

(60) Provisional application No. 62/167,930, filed on May 29, 2015.

(51) Int. Cl.
*G06F 16/51* (2019.01)
*G06K 9/00* (2006.01)
(Continued)

(52) U.S. Cl.
CPC ......... *G06K 9/00765* (2013.01); *G06F 16/51* (2019.01); *G06K 9/00255* (2013.01);
(Continued)

(58) Field of Classification Search
CPC .................................................. G06K 9/00765
See application file for complete search history.

(56) References Cited

U.S. PATENT DOCUMENTS 6,658,136 B1* 12/2003 Brumitt .............. G06K 9/00362
382/103
6,696,945 B1* 2/2004 Venetianer ......... G06K 9/00778
340/541
(Continued)

FOREIGN PATENT DOCUMENTS

WO  WO 2009/017687  2/2009
WO  WO 2012/139228  10/2012

OTHER PUBLICATIONS

Canadian Office Action for Application No. 2,931,713, dated Mar. 20, 2017, 4 pages.
(Continued)

*Primary Examiner* — Jayanti K Patel
*Assistant Examiner* — Irfan Habib
(74) *Attorney, Agent, or Firm* — Fish & Richardson P.C.

(57) ABSTRACT

This document describes systems, methods, devices, and other techniques for video camera scene translation. In some implementations, a computing device accesses a first video that shows a first 2D scene of an environment; defines a trip wire at a first position of the first 2D scene; obtains a 3D model of at least a portion of the environment shown in the first 2D scene; maps the trip wire from the first position of the first 2D scene to a first position of the 3D model that corresponds to the first position of the first 2D scene; accesses a second video that shows a second 2D scene of the environment; and projects the trip wire from the first position of the 3D model to a first position of the second 2D scene that corresponds to a same location in the environment as the first position of the first 2D scene.

20 Claims, 7 Drawing Sheets

(51) Int. Cl.

| | | |
|---|---|---|
| *H04N 7/18* | (2006.01) | |
| *G06T 15/20* | (2011.01) | |
| *G06T 19/00* | (2011.01) | |
| *G06K 9/62* | (2006.01) | |
| *G06T 7/00* | (2017.01) | |
| *G06T 7/80* | (2017.01) | |
| *G06T 7/73* | (2017.01) | |
| *G06T 7/13* | (2017.01) | |
| *G06T 7/292* | (2017.01) | |
| *G08B 13/196* | (2006.01) | |

(52) U.S. Cl.
CPC ..... *G06K 9/00295* (2013.01); *G06K 9/00718* (2013.01); *G06K 9/00744* (2013.01); *G06K 9/00771* (2013.01); *G06K 9/00778* (2013.01); *G06K 9/6202* (2013.01); *G06K 9/6263* (2013.01); *G06T 7/0002* (2013.01); *G06T 7/13* (2017.01); *G06T 7/292* (2017.01); *G06T 7/75* (2017.01); *G06T 7/80* (2017.01); *G06T 15/205* (2013.01); *G06T 19/006* (2013.01); *H04N 7/18* (2013.01); *H04N 7/181* (2013.01); *G06K 2009/00738* (2013.01); *G06T 2207/10016* (2013.01); *G06T 2207/20061* (2013.01); *G06T 2207/30168* (2013.01); *G06T 2207/30201* (2013.01); *G06T 2207/30232* (2013.01); *G06T 2207/30242* (2013.01); *G08B 13/19602* (2013.01); *G08B 13/19608* (2013.01)

(56) References Cited

U.S. PATENT DOCUMENTS

| | | | | |
|---|---|---|---|---|
| 6,970,083 | B2* | 11/2005 | Venetianer | G06K 9/00778 340/541 |
| 8,224,029 | B2* | 7/2012 | Saptharishi | G06K 9/00771 382/103 |
| 8,890,936 | B2* | 11/2014 | Sharma | G06K 9/00771 348/46 |
| 9,053,621 | B2* | 6/2015 | Lin | G08B 13/19602 |
| 9,197,861 | B2* | 11/2015 | Saptharishi | H04N 7/18 |
| 9,237,315 | B2* | 1/2016 | Naylor | H04N 7/18 |
| 9,520,040 | B2* | 12/2016 | Mavromatis | H04N 13/243 |
| 9,549,155 | B2* | 1/2017 | Heigl | G08B 13/19641 |
| 9,697,425 | B2* | 7/2017 | Saptharishi | G06K 9/00771 |
| 9,721,168 | B2* | 8/2017 | Saptharishi | H04N 7/18 |
| 9,892,606 | B2* | 2/2018 | Venetianer | G06K 9/00771 |
| 9,934,447 | B2* | 4/2018 | Kant | G06K 9/4604 |
| 2005/0134685 | A1* | 6/2005 | Egnal | H04N 7/181 348/157 |
| 2006/0227862 | A1* | 10/2006 | Campbell | G06K 9/00778 375/240 |
| 2007/0219654 | A1* | 9/2007 | Frink | G06Q 30/02 700/91 |
| 2007/0247526 | A1 | 10/2007 | Flook et al. | |
| 2009/0033746 | A1* | 2/2009 | Brown | G01S 3/7865 348/155 |
| 2009/0219387 | A1* | 9/2009 | Marman | G08B 13/19652 348/143 |
| 2010/0013917 | A1* | 1/2010 | Hanna | G06K 9/00771 348/143 |
| 2010/0013931 | A1 | 1/2010 | Golan et al. | |
| 2010/0046799 | A1* | 2/2010 | Saptharishi | G06K 9/80 382/103 |
| 2010/0194859 | A1* | 8/2010 | Heigl | G08B 13/19641 348/46 |
| 2011/0043631 | A1* | 2/2011 | Marman | H04N 5/772 348/143 |
| 2011/0050864 | A1 | 3/2011 | Bond | |
| 2011/0205359 | A1* | 8/2011 | Lee | G08B 13/19608 348/143 |
| 2012/0033746 | A1 | 2/2012 | Reilly | |
| 2012/0044247 | A1* | 2/2012 | Naimark | G06T 15/205 345/419 |
| 2012/0062732 | A1* | 3/2012 | Marman | H04N 7/18 348/142 |
| 2012/0207346 | A1* | 8/2012 | Kohli | G06K 9/00369 382/103 |
| 2012/0236024 | A1* | 9/2012 | Fujii | G06T 1/00 345/620 |
| 2012/0242809 | A1* | 9/2012 | White | G08G 1/0175 348/51 |
| 2013/0169749 | A1 | 7/2013 | Zhou et al. | |
| 2014/0132758 | A1* | 5/2014 | Saptharishi | H04N 7/18 348/135 |
| 2014/0152763 | A1 | 6/2014 | Lim et al. | |
| 2014/0211019 | A1 | 7/2014 | Choi | |
| 2016/0165193 | A1* | 6/2016 | Rasheed | G06K 9/3241 348/143 |

OTHER PUBLICATIONS

Singapore Search Report for Application No. 10201604361S, dated Nov. 7, 2016, 3 pages.
European Extended Search Report for Application No. 16171899.4, dated Oct. 10, 2016, 9 pages.
Australian Office Action for Application No. 2016203579, dated Nov. 12, 2016, 2 pages.
Australian Office Action in Application No. 2016203579, dated Jun. 22, 2016, 5 pages.
Canadian Office Action for Application No. 2,931,713, dated Feb. 21, 2018, 4 pages.
Singapore Search Report for Application No. 10201604361S, dated Dec. 6, 2018, 2016, 5 pages.
Australian Office Action in Application No. 2017204181, dated Jan. 21, 2019, 3 pages.
Singapore Examination Report for Application No. 10201604361S, dated Apr. 18, 2019, 4 pages.

* cited by examiner

VIDEO CAMERA SCENE TRANSLATION

CROSS-REFERENCE TO RELATED APPLICATION

This application claims the benefit of U.S. Provisional Application No. 62/167,930, filed May 29, 2015, and titled "Video Analytics of Video Information," which is hereby incorporated by reference in its entirety.

TECHNICAL FIELD

This specification generally relates to methods, systems, devices, and other techniques for video monitoring, and more particularly, for example, to techniques for translating video analytics rules across video scenes captured by cameras having different fields of view.

BACKGROUND

Video monitoring systems (e.g., a closed-circuit television system) can provide one or more video cameras to monitor at least one location in view of the cameras. Some video monitoring systems are configured to transmit video signals from the one or more cameras to a central location for presentation on a limited set of monitors, and in certain instances, for recording and additional analysis. For example, a video monitoring system may be adapted to capture and analyze video from various locations including banks, casinos, airports, military installations, convenience stores, parking lots, or the like. Video information from video cameras of video monitoring systems may be sent to and analyzed by a video analytics platform.

SUMMARY

This document generally describes systems, methods, devices, and other techniques for translating a scene captured by one or more cameras with a moving field of view. A video monitoring system may include one or more computers that receive video content captured by one or more video cameras. The system may analyze the video content and perform various analytics processes to detect certain events and other features of interest. For example, the system may apply analytics processes to perform facial recognition, generate safety alerts, identify vehicle license plates, perform post-event analysis, count people or objects in a crowd, track objects across multiple cameras, perform incident detection, recognize objects, index video content, monitor pedestrian or vehicle traffic conditions, detect objects left at a scene, identify suspicious behavior, or perform a combination of multiple of these.

Some video analytics processes receive as input video content from one or more cameras with moving fields of view. For example, a convenience store video monitoring system may include a video camera that monitors a front area of the convenience store, e.g., the entrance to the convenience store and a car park belonging to the convenience store, by regularly panning from left to right. In order for the convenience store monitoring system to determine a number of people in the convenience store at any given point, the convenience store monitoring system may be required to count a number of people entering or leaving the store, even when the camera has panned away from the entrance to the store.

In some implementations according to the techniques described herein, a video monitoring system can define a trip wire for performing video analytics in a video scene captured by one or more cameras and project the trip wire to new positions in subsequent video scenes as the one or more cameras change positions, e.g., pan, tilt or zoom, thus enabling continued performance of video analytics processes.

Innovative aspects of the subject matter described in this specification may be embodied in methods that include the actions of accessing, by a computing system, a first video that shows a first two-dimensional (2D) scene of a real-world environment, the first video captured by a first camera located in the real-world environment having a first field of view; defining a trip wire for performing video analytics at a first position of the first 2D scene shown in the first video; obtaining a three-dimensional (3D) model of at least a portion of the real-world environment that is shown in the first 2D scene of the first video; mapping, by the computing system, the trip wire from the first position of the first 2D scene shown in the first video to a first position of the 3D model that corresponds to the first position of the first 2D scene; accessing, by the computing system, a second video that shows a second 2D scene of the real-world environment, the second video captured by the first camera having a second field of view that is different from the first field of view or by a second camera having the second field of view; and projecting the trip wire from the first position of the 3D model to a first position of the second 2D scene that corresponds to a same location in the real-world environment as the first position of the first 2D scene.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus (e.g., one or more computers or computer processors), cause the apparatus to perform the actions.

The foregoing and other embodiments can each optionally include one or more of the following features, alone or in combination. In some implementations the defined trip wire is associated with one or more rules for performing video analytics.

In some cases the one or more rules for performing video analytics comprise counting a number of objects crossing the trip line.

In some implementations the method further comprises performing video analytics using the projected trip wire at the first position of the second 2D scene.

In some cases the method further comprises determining that the first camera has moved and has a second field of view that is different from the first field of view.

In some implementations the first camera is at a fixed position in the environment and determining that the first camera has moved comprises determining that the first camera has one or more of (i) panned, (ii) tilted, and/or (iii) zoomed.

In some cases the first camera is mobile and determining that the first camera has moved comprises determining translations and rotations of the video camera.

In some cases determining that the first camera has moved comprises using one or more sensors to identify movement of the first camera.

In some implementations determining that the first camera has moved comprises calculating a displacement between the first field of view and the second field of view.

In some cases determining that the first camera has moved comprises using one or more sensors to identify movement of the first camera and calculating a displacement between the first field of view and the second field of view.

In some implementations the 3D model comprises (i) a ground plane of at least a portion of the real-world environment that is shown in the first 2D scene of the first video, and (ii) a first camera location relative to the ground plane.

In some cases the 3D model comprises a detailed 3D model of at least a portion of the real-world environment that is shown in the first 2D scene of the first video, wherein the detailed 3D model comprises objects and buildings in the portion of the real-world environment that is shown in the first 2D scene of the first video.

In some implementations the 3D model is automatically generated from one or more 2D fields of view of the first camera.

In some cases the 3D model is generated using standard 3D modeling techniques.

In some implementations the defined trip wire comprises a line drawn in space relative to a ground plane of the portion of the real-world environment that is shown in the first 2D scene of the first video.

In some cases the defined trip wire comprises (i) a line, or (ii) one more lines defining a closed boundary, drawn in various directions in the 3D model.

In some cases defining a trip wire for performing video analytics comprises identifying user input specifying the first position of the trip wire.

In some implementations innovative aspects of the subject matter described in this specification may be embodied in methods that include the actions of obtaining a frame of view for a video camera; detecting a change in the frame of view for the video camera; determining that changed frame of view is recognizable; and in response to determining that the changed frame of view is recognizable, loading and applying a video analytics calibration for the changed frame of view.

Some implementations of the subject matter described herein may realize, in certain instances, one or more of the following advantages.

A video camera scene translation system as described in this specification provides a practical and efficient way for defining video analytics rules by defining zones or lines of interest in a 2D scene captured by a video camera and projecting the defined zones or lines of interest onto a new 2D scene captured by a video camera at a different position or with a different field of view. By projecting defined zones and lines of interest, a video camera scene translation system is able to seamlessly perform video analytics using moving cameras, e.g., Pan Tilt Zoom cameras, thus improving the accuracy of performed video analytics. Furthermore, since a video camera scene translation system accommodates movable cameras, the system does not require a system of cameras at fixed positions to monitor a given environment, leading to a potential reduction in a number of cameras required by a video monitoring system.

A video camera scene translation system as described in this specification may provide an intuitive and reliable system and method for defining video analytic rules by defining zones or lines of interest on a standard map, as opposed to defining zones of interest on camera fields of view themselves. The defined zones or lines may then be combined with knowledge of the position, field of view and other details of a corresponding system of video cameras and translated into corresponding image-plane zones for each of the cameras in the system of video cameras.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

FIG. 1A shows a first two-dimensional scene, and FIG. 1B shows a second two-dimensional scene, with each image showing a same video analytics trip wire with different geometries.

Like reference symbols in the various drawings indicate like elements.

DETAILED DESCRIPTION

This specification generally describes systems, methods, devices, and other techniques for applying video analytics to video cameras that provide a moving field of view, such as pan-tilt-zoom (PTZ) video cameras or other fixed or mobile cameras that are capable of capturing a scene of an environment from multiple different fields of view (e.g., smartphone video cameras, handheld dedicated video cameras, drone-mounted video cameras, CCTV cameras). In some implementations, a video analytics platform can define different video analytics processes to apply to a video signal for different fields of view captured by video cameras at different camera positions. After defining the different video analytics, the video analytics platform may detect a particular field of view received from the video camera, and may apply defined video analytics associated with the particular field of view. In some implementations, the video analytics platform may recognize a particular scene (e.g., a particular field of view) from PTZ video cameras, and may automatically load a defined video analytics configuration on the PTZ video cameras. In some implementations, the video analytics platform may translate a trip wire line, zone (e.g., a polygon), or other boundary defined for a video analytics process, from a scene captured by a camera having a first field of view to an equivalent location of a scene captured by a same or different camera having a different, second field of view.

Figure 1A:
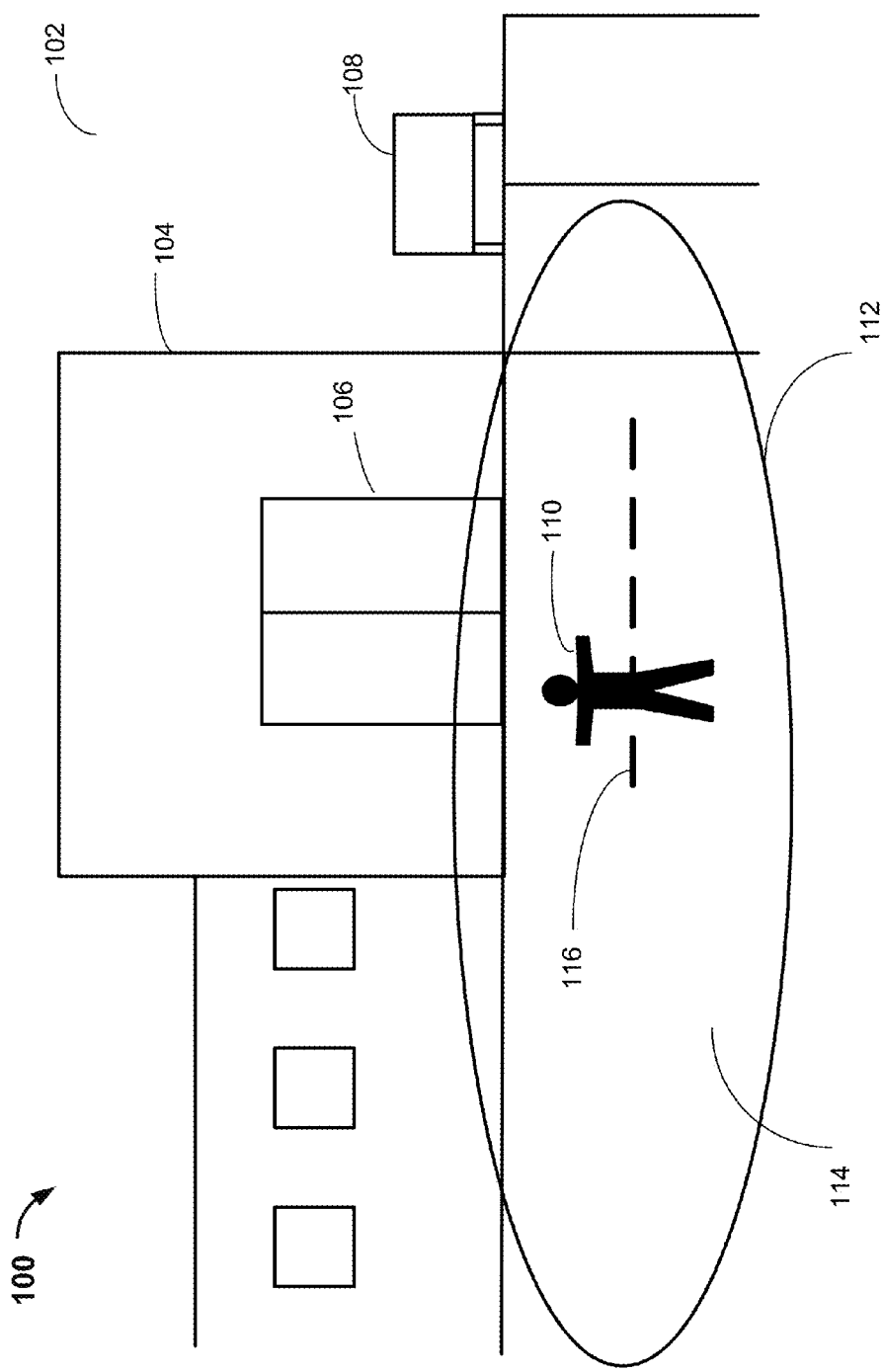
FIGS. 1A and 1B depict example two-dimensional scenes of a real-world environment. In particular.
Figure 1B:
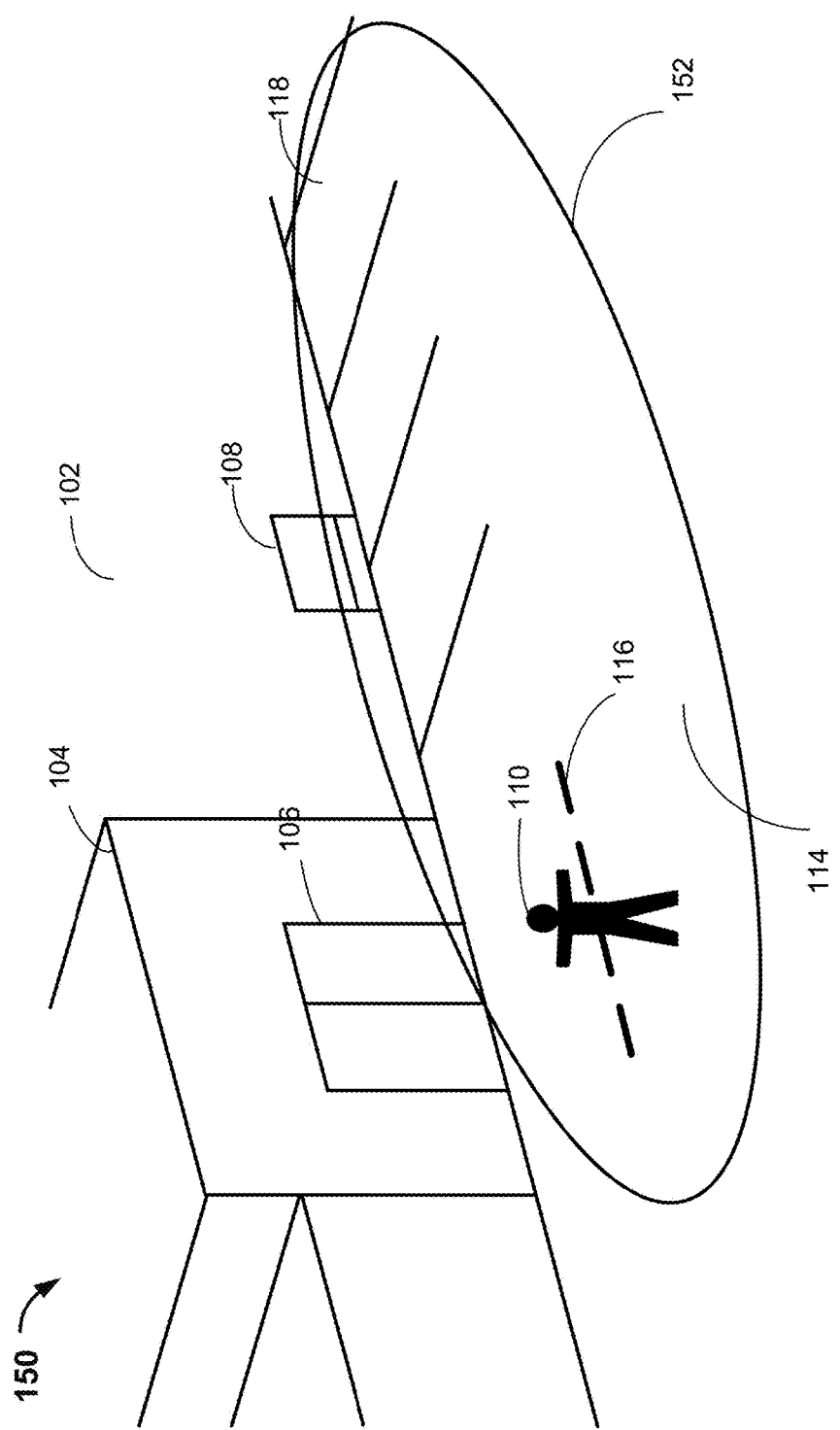

FIGS. 1A and 1B depict example two-dimensional (2D) scenes 100 and 150 of a real-world environment 102. The scenes 100 and 150 may be images from frames of respective video signals captured by cameras having different fields of view (e.g., cameras viewing a same location from different angles or perspectives). The example 2D scenes 100 and 150 are 2D scenes of a real-world environment 102.

For example, both 2D scene 100 and 2D scene 150 depict a real-world environment 102 including a building 104, entrance to the building 106, street sign 108 and person 110.

The example 2D scenes 100 and 150 depict the real-world environment 102 from differing angles. For example, 2D scene 100 depicts the real-world environment 102 from a view point located directly in front of building 104 at an angle perpendicular to the building front. 2D scene 100 further includes an area 112 that represents a first field of view of a video camera located directly in front of building 104. For example, the first field of view 112 may represent a field of view for a video camera installed directly in front of and looking directly towards the building 104.

The first field of view 112 includes a trip wire 116. A trip wire is generally a virtual line or collection of lines overlaid on a two or three dimensional image specified by two or more end points or an adjacent edge of a polygon. In some cases a trip wire may be a user-defined virtual line or collection of lines. A trip wire may be used by a video analytics platform to perform video analytics. For example, a trip wire may be used to monitor a particular area over a given time period and determine quantities of interest, such as a number of people crossing a trip wire to enter a building or car park, a speed and direction of a moving object in a video signal or a number of people located in a particular zone of an environment, e.g., by comparing 2D coordinates of detected objects against the 2D trip wire. In the example 2D scene 100, the building 104 may represent a convenience store and the trip line 116 may be used by a video analytics platform to monitor a number of people located in the convenience store at a given time. In some implementations the video analytics platform may generate an alarm if an object crosses or intersects the trip wire.

2D scene 150 depicts the real-world environment 102 from a view point located directly in front of building 104, as in 2D scene 100, at an acute angle relative to the building front. 2D scene 150 further includes an area 152 that represents a second field of view of a video camera located directly in front of building 104, as described with reference to 2D scene 100, but panned towards the right. For example, the second field of view 112 may represent a field of view for a video camera installed directly in front of the building 104 and looking towards one or more car park bays 118.

The second field of view 152 includes trip wire 116 as described above. In 2D scene 150, trip wire 116 has been projected to a different geometry and position in the 2D scene 150 that corresponds to a same location in the environment 102 as the position of trip wire 116 as shown in 2D scene 100. Projecting a trip wire as part of a video camera scene translation process is described in more detail below with reference to FIGS. 2-5.

Figure 2:
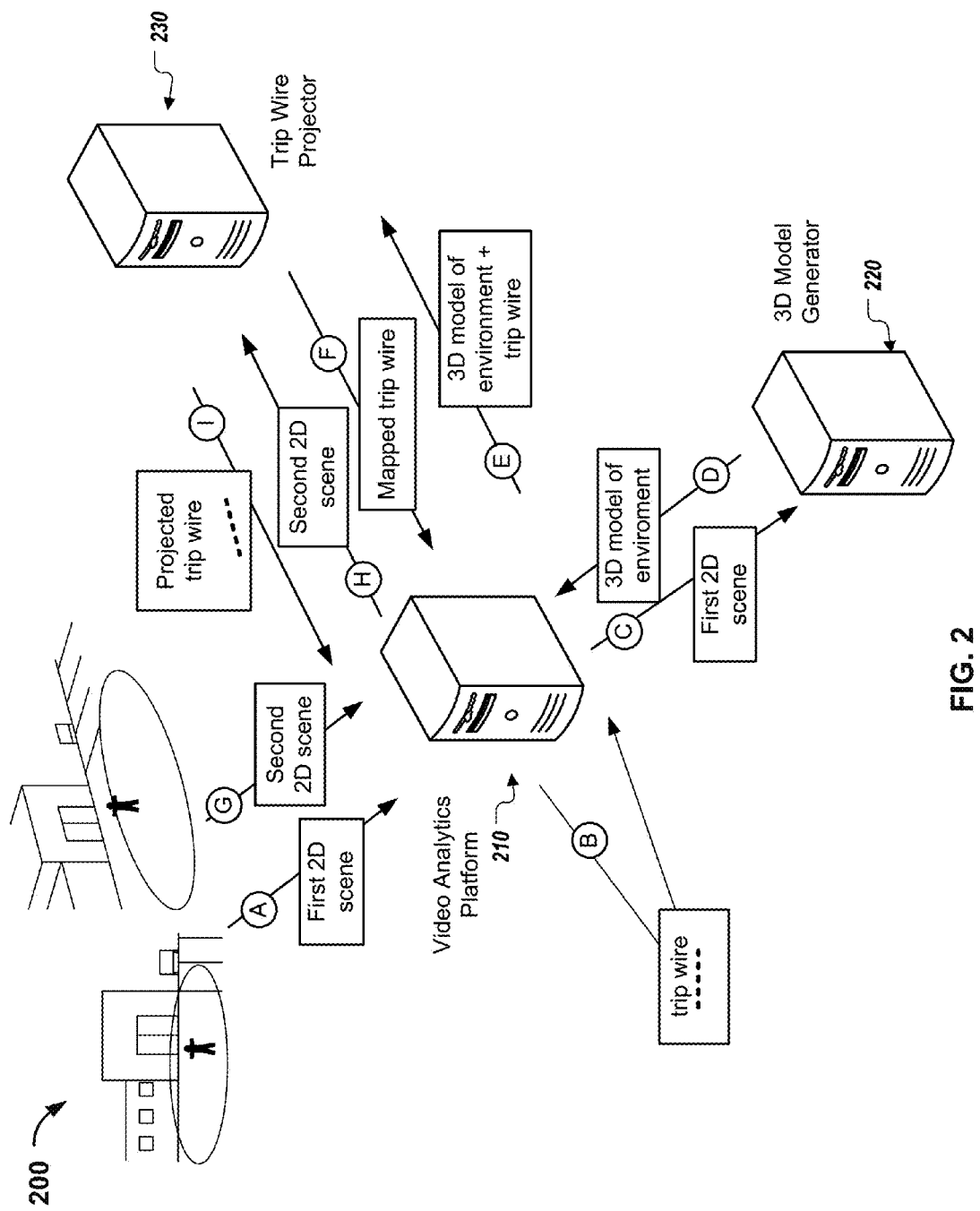
FIG. 2 depicts a conceptual block diagram of an example system for video camera scene translation.

FIG. 2 depicts a conceptual block diagram of an example system for video camera scene translation. The system 200 can be enabled to receive data that represents a first video that shows a first two-dimensional (2D) scene of a real-world environment. The system 200 may define a trip wire for performing video analytics at a first position of the 2D scene and obtain a three-dimensional (3D) model of at least a portion of the real-world environment that is shown in the 2D scene. The system maps the trip wire from the first position of the first 2D scene to a first position of the 3D model that corresponds to the first position in the first 2D scene. The system 200 may further receive data that represents a second video that shows a second 2D scene of the real-world environment and project the trip wire from the first position of the 3D model to a first position of the second 2D scene that corresponds to a same location in the real-world environment as the first position of the first 2D scene. Generally, the system 200 can be implemented as a system of one or more computers having physical hardware like that described with respect to FIG. 6 below. The computing system may include one or more computers that operate in a coordinate fashion across one or more locations.

Briefly, the system 200 includes a video analytics platform 210, a 3D model generator 220, and a trip wire projector 230. The components of the system 200 can exchange electronic communications over one or more networks, or can exchange communications in another way, such as over one or more wired or wireless connections. As depicted in FIG. 2, a process for video camera scene translation can be accomplished by the system 200.

During stage (A) of the process for video camera scene translation, the video analytics platform 210 receives data representing first video showing a first 2D scene of a real world environment that was taken by a first camera located in the real-world environment having a first field of view. For example, the video analytics platform 210 may receive data representing a first video captured by a first camera located in a real-world environment 102 having a first field of view 112 that shows a first 2D scene of the real-world environment 102, as described in more detail above with reference to FIG. 1A. In some implementations the field of view of the camera is a conical field of view.

During stage (B), the video analytics platform 210 defines a trip wire for performing video analytics at a first position of the first 2D scene shown in the first video. For example, the video analytics platform 210 may define a trip wire 116 as a line drawn in space relative to a ground plane 114 of the portion of the real world environment 102 that is shown in the first 2D scene, as described above with reference to FIG. 1A. The line may be associated with one or more rules for performing video analytics, e.g., counting a number of objects that cross the line or pass through a 2D plane defined by the line and the ground plane or determining a speed and direction of an object crossing a line, as described above with reference to FIGS. 1A and 1B.

As another example, the video analytics platform 210 may define a trip wire as a polygon that defines a closed boundary, e.g., a trip line that follows the four sides of a window of a building. The polygon may be associated with one or more rules for performing video analytics, e.g., counting a number of objects within an area defined by the polygon In general, the defined trip line may include one or more lines drawn in various directions. The particular shape and size of the trip wire is dependent on the particular video analytics task that is to be performed using the respective trip wire. In some cases, the video analytics platform 210 may receive user input specifying the position and shape of the trip wire.

In some implementations the video analytics platform 210 may define a trip wire for performing video analytics with respect to a first position of a 2D map of the real-world environment, where the map of the real-world environment represents an overhead view of the real-world environment, as described below with reference to FIG. 5.

During stage (C) the video analytics platform 210 may transmit data that represents the 2D scene of the real-world environment shown in the received video to a 3D model generator 220. The 3D model generator 320 may receive the data representing the 2D scene of the real-world environment shown in the received video and obtain or generate a 3D model of at least a portion of the real-world environment.

In some cases the 3D model generator may be configured to generate a 3D model that includes a ground plane of the portion of the real-world environment shown in the first 2D scene of the first video and a first camera location relative to the ground plane. In other cases the 3D model generator may be configured to generate a detailed 3D model of the portion of the real-world environment shown in the first 2D scene of the first video. For example, a detailed 3D model may include buildings and objects, e.g., trees, park benches or street signs, that are located in the portion of the real-world environment that is shown in the first 2D scene of the first video. In the example illustrated in FIGS. 1A and 1B, a detailed 3D model could include the convenience store, store entrance, store windows, car park sign, marked car park bays, and sidewalk, whereas a simple 3D model could include fewer identified objects, e.g., the ground plane and camera location.

The 3D model generator 220 may generate the 3D model of the portion of the real-world environment using one or more 2D scenes taken by the first camera located in the real-world environment having the first field of view, or one or more 2D scenes taken by the same camera or a different camera located in the real-world environment having different respective fields of view. For example, in some cases the video analytics platform 210 may be in data communication with multiple cameras located at different positions within the real-world environment. In this case, the video analytics platform 210 may transmit data specifying multiple 2D scenes of respective multiple videos captured by the multiple cameras. The 3D model generator 220 may receive the data specifying the multiple 2D scenes and build a 3D model of the environment in which the cameras are located using the received data. In some implementations the 3D model generator may use standard modeling techniques to generate the 3D model.

In some implementations, the 3D model of an environment may be pre-defined and the video analytics platform 210 may call on the 3D model generator 220 to access an appropriate 3D model for the environment shown in a scene of a video. The pre-defined 3D model may have been generate automatically based on analysis of previously captured video or may have been defined manually by a user and stored.

During stage (D), the 3D model generator 220 may transmit data that represents the generated 3D model to the video analytics platform 210. The video analytics platform 210 can receive the data that represents the generated 3D model and, during operation (E), transmit data that represents the generated 3D model and the defined trip wire for performing video analytics at the first position of the first 2D scene shown in the first video to the trip wire projector 230. The trip wire projector 230 can receive the data representing the generated 3D model and the defined trip wire for performing video analytics at the first position of the first 2D scene shown in the first video and map the trip wire from the first position of the first 2D scene to a first position of the 3D model that corresponds to the first position of the first 2D scene. For example, if the defined trip wire was located directly in front of the entrance of a convenience store in the 2D scene, the mapped trip wire in the 3D model would also be located directly in front of the entrance to the convenience store and be of the same thickness/width as the defined trip wire in the 2D scene.

During stage (F), the trip wire projector 230 transmits data representing the mapped trip wire at the first position of the 3D model corresponding to the first position of the first 2D scene to the video analytics platform 210.

During stage (G), the video analytics platform 210 receives data representing a second video showing a second 2D scene of the real world environment that was taken by the first camera having a second field of view that is different from the first field of view or by a second camera having the second field of view. For example, the video analytics platform 210 may receive data representing a second video showing a second 2D scene of the real world environment that was taken by the first camera located at a same fixed position but from a different angle, e.g., after the first camera panned, tilted or zoomed. As another example, the video analytics platform 210 may receive data representing a second video showing a second 2D scene of the real world environment that was taken by the first camera located at a different position in the real-world environment, where the different position in the real-world environment is determined by detecting translations and rotations, e.g., using one or more sensors, of the 2D scene captured by the video camera or by calculating a displacement between the first field of view and the second field of view. As another example, the video analytics platform 210 may receive data representing a second video showing a second 2D scene of the real world environment that was taken by a second camera different to the first camera, e.g., in the case when video analytics platform 210 communicates with multiple cameras. An example second 2D scene of a same real-world environment as a first 2D scene is described in more detail above with reference to FIG. 1B.

During stage (H), the video analytics platform 210 transmits data representing the second 2D scene of the real-world environment to the trip wire generator 230. The trip wire generator 230 receives the data that represents the second 2D scene and projects the trip wire from the first position in the 3D model to a first position of the second 2D scene that corresponds to a same location in the real-world environment as the first position of the first 2D scene. For example, although the appearance of the trip wire in the first 2D scene and second 2D scene may differ, e.g., in terms of angle or length relative to the 2D scenes, if the defined trip wire was located directly in front of the entrance of a convenience store in the first 2D scene, the projected trip wire in the second 2D scene would also be located directly in front of the entrance to the convenience store and be of the same thickness/width as the defined trip wire in the first 2D scene.

During stage (I), the trip wire generator 230 transmits data representing the projected trip wire at the first position of the second 2D scene to the video analytics platform 210. The video analytics platform 210 may receive the transmitted data representing the projected trip wire and use the projected trip wire to perform video analytics.

The stages (G)-(I) may be repeated each time the video analytics platform receives data representing an additional video showing another 2D scene of the real world environment that was taken by the first camera having an alternative field of view that is different from previous fields of view or by another camera having the alternative field of view. At each stage (I), the projected trip line follows a real-world boundary and is recomputed and applied as the camera moves to different positions to show different 2D scenes or as a system of multiple cameras switches from one 2D scene to another.

In some implementations one or more of the stages (A)-(I) may be performed in a different order to that described above, or not at all. For example, in some implementations the video analytics platform 210 may receive information that defines a trip wire with respect to a first position of a two-dimensional (2D) map (e.g., an overhead schematic diagram or blueprint) of a real-world environment, as described above with reference to stage (B), obtain a three-dimensional (3D) model of at least a portion of the real-world environment, as described in stage (D), map the trip wire from the first position of the 2D map of the real-world environment to a first position of the 3D model that corresponds to a same location in the real-world environment as the first position of the 2D map, as described in stage (F), access a video that shows a 2D scene of the real-world environment, as described in stages (A) or (G), and project the trip wire line from the first position of the 3D model to a first position of the 2D scene that corresponds to the same location in the real-world environment as the first position of the 2D map, as described in stage (I).

Figure 3:
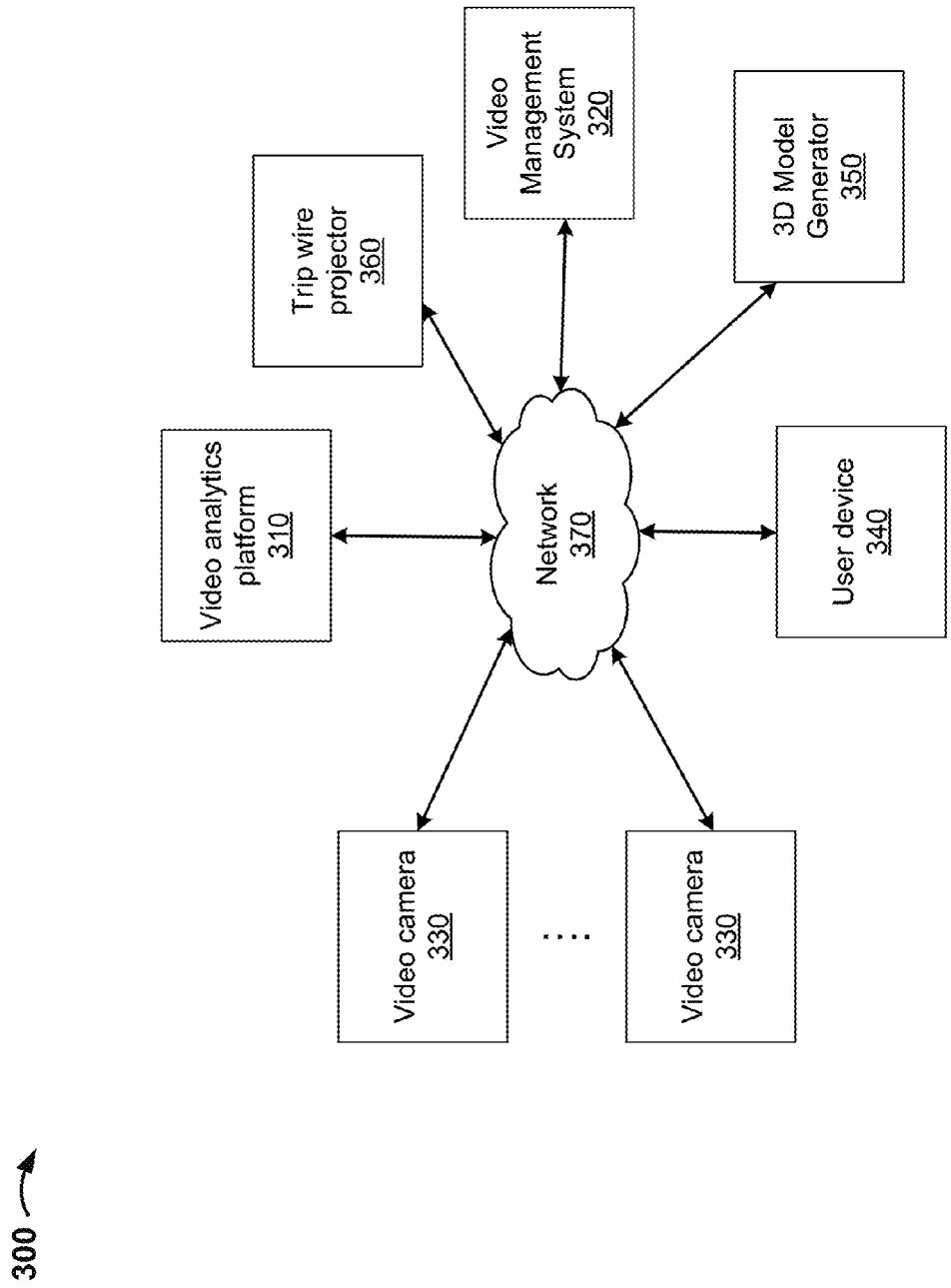
FIG. 3 depicts an example system for video camera scene translation.

FIG. 3 depicts an example system 300 for video camera scene translation. In some implementations, a computer network 370, such as a local area network (LAN), wide area network (WAN), the Internet, or a combination thereof, connects video analytics platform 310, video management system 320, multiple video cameras 330, user device 340, 3D model generator 350 and trip wire projector 360. In some implementations, all or some of the video analytics platform 310, video management system 320, multiple video cameras 330, user device 340, 3D model generator 350 and trip wire projector 360 can be implemented in a single computing system, and may communicate with none, one, or more other components over a network.

Video analytics platform 310 may include one or more devices capable of receiving, generating, storing, processing, and/or providing information, such as information described herein. For example, video analytics platform 310 may include one or more computing devices, such as one or more server devices, desktop computers, workstation computers, virtual machines (VMs) provided in a cloud computing environment, or similar devices. In some implementations, video analytics platform 310 may receive video information from video management systems 320 and/or video cameras 330, and may store the video information. In some implementations, video analytics platform 310 may receive video information and/or other information (e.g., fire alarms, weather alerts, or the like) from other devices and/or systems, such as, for example, social media systems, mobile devices, emergency service systems (e.g., police, fire department, weather agencies, or the like), building management systems, or the like.

In some implementations, video analytics platform 310 may apply video analytics to automatically analyze the video information and to generate real-time safety information, security information, operations information, or marketing information. The safety information may include information associated with utilization of restricted or forbidden areas, fire and/or smoke detection, overcrowding and/or maximum occupancy detection, slip and/or fall detection, vehicle speed monitoring, or the like. The security information may include information associated with perimeter monitoring, access control, loitering and/or suspicious behavior, vandalism, abandoned and/or removed objects, person of interest tracking, or the like. The operations information may include information associated with service intervention tracking, package and/or vehicle count, mobile asset locations, operations layout optimization, resource monitoring and/or optimization, or the like. The marketing information may include information associated with footfall traffic, population density analysis, commercial space layout optimization, package demographics, or the like.

In some implementations, the video analytics applied by video analytics platform 310 may include people recognition, safety alert generation, license plate recognition, augmented reality, post-event analysis, crowd counting, cross-camera tracking, incident detection, wide-spectrum imagery, object recognition, video indexing, traffic monitoring, footfall traffic determination, left object detection, suspicious behavior detection, or the like. In some implementations, video analytics platform 310 may generate a user interface that includes the real-time safety information, the security information, the operations information, or the marketing information, and may provide the user interface to user device 340. User device 340 may display the user interface to a user of user device 340.

Video management system 320 may include one or more devices capable of receiving, generating, storing, processing, and/or providing information, such as information described herein. For example, video management system 320 may include a computing device, such as a server, a desktop computer, a laptop computer, a tablet computer, a handheld computer, one or more VMs provided in a cloud computing environment, or a similar device. In some implementations, video management system 320 may be associated with a company that receives, stores, processes, manages, and/or collects information received by video cameras 330. In some implementations, video management systems 320 may communicate with video analytics platform 310 via network 370.

Video camera 330 may include a device capable of receiving, generating, storing, processing, and/or providing video information, audio information, and/or image information. For example, video camera 330 may include a photographic camera, a video camera, a microphone, or a similar device. In some implementations, video camera 330 may include a PTZ video camera. In some implementations, video camera 330 may communicate with video analytics platform 310 via network 370.

User device 340 may include a device capable of receiving, generating, storing, processing, and/or providing information, such as information described herein. For example, user device 340 may include a computing device, such as a desktop computer, a laptop computer, a tablet computer, a handheld computer, a smart phone, a radiotelephone, or a similar device. In some implementations, user device 340 may communicate with video analytics platform 310 via network 350.

3D model generator 350 may include one or more devices capable of accessing or generating a 3D model of a real-world environment. For example, 3D model generator 350 may be configured to generate a 3D model of an environment based on one or more 2D scenes of the environment, e.g., as captured by a video camera at one or more positions in the environment. For example, the 3D models generated by 3D model generator 350 may include a ground plane of at least a portion of an environment that is shown in a 2D scene captured by a video camera and a video camera location relative to the ground plane. As another example, the 3D models generated by 3D model generator 350 may include detailed 3D models including objects and buildings in an environment that is shown in a 2D scene captured by a video camera. In some implementations, 3D model generator 350 may be configured to generate the 3D model using standard 3D modeling techniques, such as.

Trip wire projector 360 may include one or more devices capable of mapping a trip wire at a first position in a first 2D scene to a first position in a 3D model, or of projecting a trip wire at a first position in a 3D model to a first position in a second 2D scene.

Network 370 may include one or more wired and/or wireless networks. For example, network 370 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a cloud computing network, and/or a combination of these or other types of networks.

Figure 4:
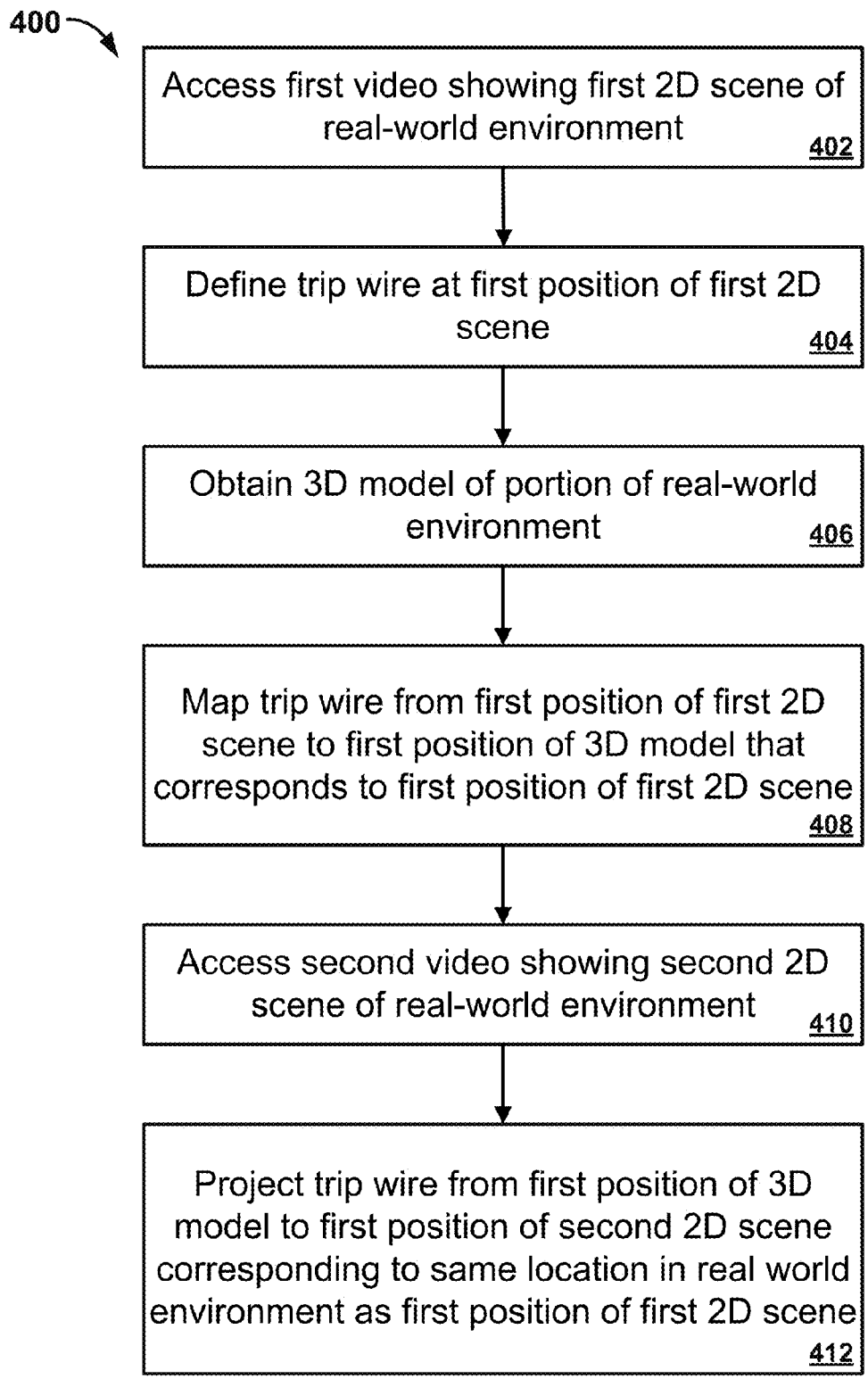
FIGS. 4 and 5 are flowcharts of example processes for video camera scene translation.

FIG. 4 is a flowchart of an example process 400 for video camera scene translation. In some implementations, the process 400 may be carried out by the devices and systems described herein, including computing system 300 depicted in FIG. 3. Although the flowchart depicts the various stages of the process 400 occurring in a particular order, certain stages may in some implementations be performed in parallel or in a different order than what is depicted in the example process 400 of FIG. 4.

At step 402, the system accesses, by a computing system, a first video that shows a first two-dimensional (2D) scene of a real-world environment. The first video may be a video captured by a first camera located in the real-world environment having a first field of view, e.g., as depicted by FIG. 1A above.

At step 404, the system defines a trip wire for performing video analytics at a first position of the first 2D scene shown in the first video. In some implementations the defined trip wire includes (i) a line, or (ii) one more lines defining a closed boundary, e.g., a polygon, drawn in various directions in the 3D model. For example, the defined trip wire may include a line drawn in space relative to a ground plane of the portion of the real-world environment that is shown in the first 2D scene of the first video. In some implementations the system may define a trip wire for performing video analytics by identifying user input specifying the first position of the trip wire.

The define trip wire may be associated with one or more rules for performing video analytics. For example, in some implementations the one or more rules for performing video analytics may include counting a number of objects crossing the trip line. Other examples include determining a number of people within a given zone that is bordered by trip wires, or determining a speed or direction an object crosses a trip wire.

At step 406, the system obtains a three-dimensional (3D) model of at least a portion of the real-world environment that is shown in the first 2D scene of the first video. In some implementations the 3D model may include a ground plane of at least a portion of the real-world environment that is shown in the first 2D scene of the first video and a first camera location relative to the ground plane. In other implementations the 3D model may include a detailed 3D model of at least a portion of the real-world environment that is shown in the first 2D scene of the first video, wherein the detailed 3D model includes objects and buildings in the portion of the real-world environment that is shown in the first 2D scene of the first video. The 3D model may be automatically generated from one or more 2D fields of view of the first camera, e.g., using standard 3D modeling techniques.

At step 408, the system maps, by the computing system, the trip wire from the first position of the first 2D scene shown in the first video to a first position of the 3D model that corresponds to the first position of the first 2D scene.

At step 410, the system accesses, by the computing system, a second video that shows a second 2D scene of the real-world environment, the second video captured by the first camera having a second field of view that is different from the first field of view or by a second camera having the second field of view. For example, in some implementations the system may determine that the first camera has moved and has a second field of view that is different from the first field of view, and access a second video showing a 2D scene of the real-world environment as captured by the first camera at the new position. For example, the first camera may be at a fixed position in the environment and the system may determine that the first camera has moved by determining that the first camera has one or more of (i) panned, (ii) tilted, and/or (iii) zoomed. In another example, the first camera may be mobile and the system may determine that the first camera has moved by determining translations and rotations of the video camera. In either case, the system may determine that the first camera has moved by using one or more sensors that identify movement of the first camera. Alternatively, the system may determine that the first camera has moved by calculating a displacement between the first field of view and the second field of view. In some examples the system may determine that the first camera has moved by using one or more sensors to identify movement of the first camera and calculating a displacement between the first field of view and the second field of view.

At step 412, the system projects the trip wire from the first position of the 3D model to a first position of the second 2D scene that corresponds to a same location in the real-world environment as the first position of the first 2D scene.

The system may perform video analytics using the projected trip wire at the first position of the second 2D scene. In some implementations the steps 410 and 412 may be repeated, e.g., the system may access additional videos showing alternative 2D scenes of the real-world environment and, for each alternative 2D scene, project the defined trip wire to a first position of the respective 2D scene corresponding to the same location in the real-world environment as the first position of the first 2D scene. For example, the system may use the projected trip wire, and any further projected trip wires resulting from application of the process 400, in motion detection systems that determine the presence of relevant motion in a zone of an observed environment. As another example, the system may use projected trip wires in object detection systems that determine the presence of a type of object or entity in a zone of an observed environment. As a further example, the system may use projected trip wires in dynamic masking systems that block parts of a video signal based on the video signal itself, e.g., due to privacy concerns.

Figure 5:
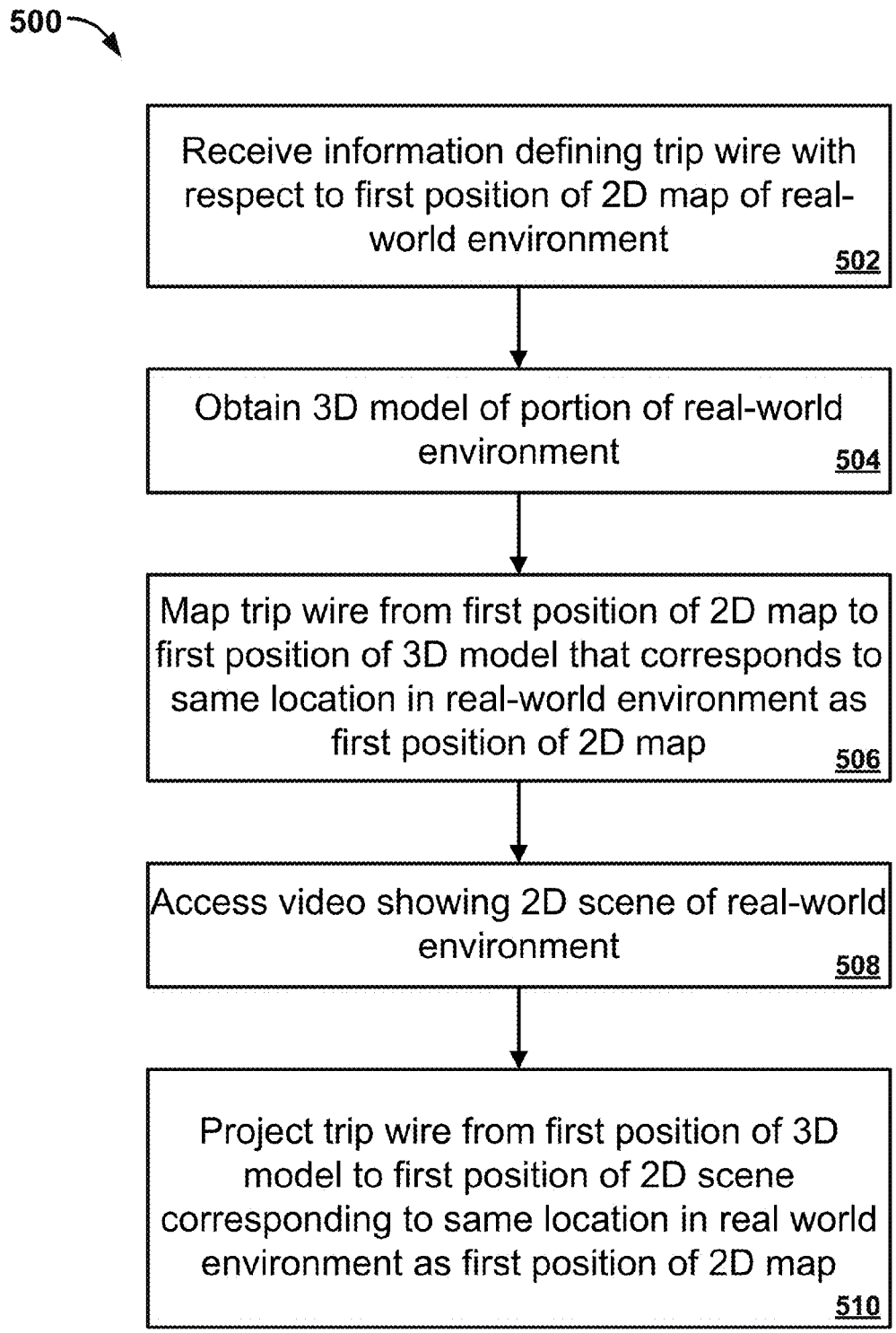

FIG. 5 is a flowchart of an example process 500 for video camera scene translation. In some implementations, the process 500 may be carried out by the devices and systems described herein, including computing system 300 depicted in FIG. 3. Although the flowchart depicts the various stages of the process 500 occurring in a particular order, certain stages may in some implementations be performed in parallel or in a different order than what is depicted in the example process 500 of FIG. 5.

At step 502, the system receives, at a computing system, information that defines a trip wire with respect to a first position of a two-dimensional (2D) map of a real-world environment. The 2D map of the real-world environment represents an overhead view of the real-world environment. In some implementations the defined trip wire includes (i) a line, or (ii) one more lines defining a closed boundary, e.g., a polygon, drawn in various directions in the 3D model. For example, the defined trip wire may include a line drawn in space relative to a ground plane of the 2D map of the real-world environment. In some implementations the received information that defines the trip wire may be information that has been specified by a user.

At step 504, the system obtains a three-dimensional (3D) model of at least a portion of the real-world environment. In some implementations the 3D model may include a ground plane of the portion of the real-world environment. In other implementations the 3D model may include a detailed 3D model of the real-world environment, wherein the detailed 3D model includes objects and buildings in the portion of the real-world environment. The 3D model may be automatically generated using standard 3D modeling techniques.

At step 506, the system maps, by the computing system, the trip wire from the first position of the 2D map of the real-world environment to a first position of the 3D model that corresponds to a same location in the real-world environment as the first position of the 2D map.

At step 508, the system accesses, by the computing system, a video that shows a 2D scene of the real-world environment. The video showing the 2D scene of the real world environment may be a video captured by a video camera located in the real-world environment.

At step 510, the system projects the trip wire from the first position of the 3D model to a first position of the 2D scene that corresponds to the same location in the real-world environment as the first position of the 2D map. The system may perform video analytics using the projected trip wire at the first position of the 2D scene. For example, the system may use the projected trip wire, and any further projected trip wires resulting from application of the process 500, in motion detection systems that determine the presence of relevant motion in a zone of an observed environment. As another example, the system may use projected trip wires in object detection systems that determine the presence of a type of object or entity in a zone of an observed environment. As a further example, the system may use projected trip wires in dynamic masking systems that block parts of a video signal based on the video signal itself, e.g., due to privacy concerns.

Figure 6:
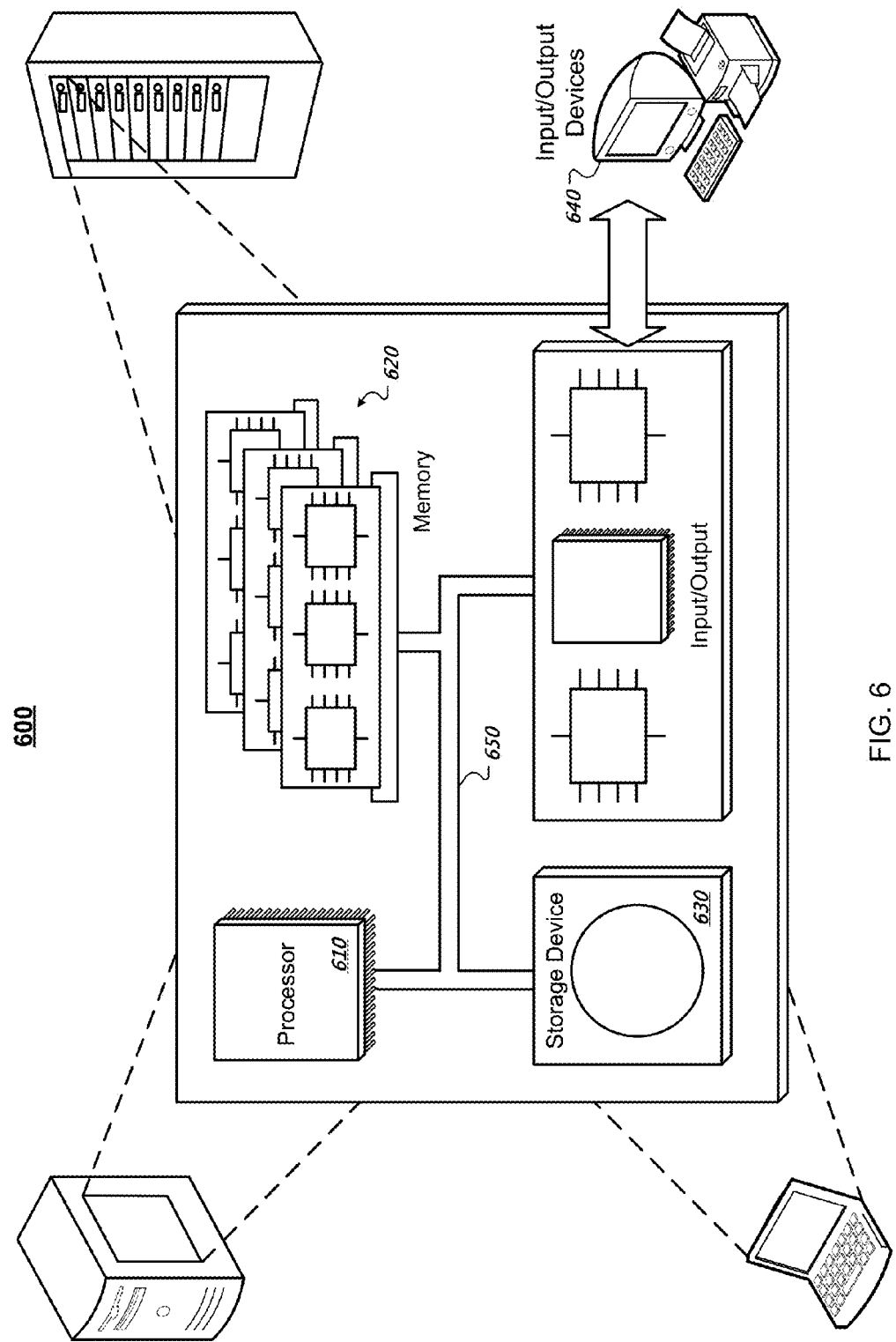
FIG. 6 depicts an example computing device that may be used to carry out the computer-implemented methods and other techniques described herein.

FIG. 6 illustrates a schematic diagram of an exemplary generic computer system 600. The system 600 can be used for the operations described in association with the processes 400 and 500 according to some implementations. The system 600 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 600 includes a processor 610, a memory 620, a storage device 630, and an input/output device 640. Each of the components 610, 620, 630, and 620 are interconnected using a system bus 650. The processor 610 may be enabled for processing instructions for execution within the system 600. In one implementation, the processor 610 is a single-threaded processor. In another implementation, the processor 610 is a multi-threaded processor. The processor 610 may be enabled for processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 may be enabled for providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method, comprising:
accessing, by a computing system, a first video that shows a first two-dimensional (2D) scene of a real-world environment, the first video captured by a first camera located in the real-world environment having a first field of view;
defining a trip wire for performing video analytics at a first position of the first 2D scene shown in the first video, wherein the trip wire is defined based on a user input that draws a line over the first video and that at least partially defines a zone of interest in the first 2D scene of the real-world environment;
generating, based on processing the first video using a three-dimensional (3D) model generator, a 3D model of at least a portion of the real-world environment that is shown in the first 2D scene of the first video;
mapping, by the computing system, the trip wire from the first position of the first 2D scene shown in the first video to a first position of the 3D model that corresponds to the first position of the first 2D scene;
after the trip wire that is defined based on the user input over the first video is mapped from the first position of the first 2D scene shown in the first video to the first position of the 3D model, determining, by the computing system, that a second video that shows a second 2D scene of the real-world environment has become available, the second video captured by a second camera having the second field of view;
projecting the trip wire from the first position of the generated 3D model to a first position of the second 2D scene that corresponds to a same location in the real-world environment as the first position of the first 2D scene, wherein projecting the trip wire includes adjusting an angle and a length of the line that at least partially defined the zone of interest in the first 2D scene to define a corresponding zone of interest in the second 2D scene; and generating a user interface that includes the second 2D scene and the trip wire that has been projected to the first position of the second 2D scene, or performing video analytics on the second 2D scene using the trip wire that has been projected to the first position of the second 2D scene.

2. The method of claim 1, wherein the defined trip wire is associated with one or more rules for performing video analytics.

3. The method of claim 2, wherein the one or more rules for performing video analytics comprise counting a number of objects crossing the trip line.

4. The method of claim 1, further comprising determining that the first camera has moved and has a second field of view that is different from the first field of view.

5. The method of claim 4, wherein the first camera is at a fixed position in the environment and determining that the first camera has moved comprises determining that the first camera has one or more of (i) panned, (ii) tilted, and/or (iii) zoomed.

6. The method of claim 4, wherein the first camera is mobile and determining that the first camera has moved comprises determining translations and rotations of the video camera.

7. The method of claim 4, wherein determining that the first camera has moved comprises using one or more sensors to identify movement of the first camera.

8. The method of claim 4, wherein determining that the first camera has moved comprises calculating a displacement between the first field of view and the second field of view.

9. The method of claim 4, wherein determining that the first camera has moved comprises using one or more sensors to identify movement of the first camera and calculating a displacement between the first field of view and the second field of view.

10. The method of claim 1, wherein the 3D model comprises (i) a ground plane of at least a portion of the real-world environment that is shown in the first 2D scene of the first video, and (ii) a first camera location relative to the ground plane.

11. The method of claim 1, wherein the 3D model comprises a detailed 3D model of at least a portion of the real-world environment that is shown in the first 2D scene of the first video, wherein the detailed 3D model comprises objects and buildings in the portion of the real-world environment that is shown in the first 2D scene of the first video.

12. The method of claim 1, wherein the defined trip wire comprises a line drawn in space relative to a ground plane of the portion of the real-world environment that is shown in the first 2D scene of the first video.

13. One or more non-transitory computer-readable media having instructions stored thereon that, when executed by one or more processors, cause performance of operations comprising:

accessing, by a computing system, a first video that shows a first two-dimensional (2D) scene of a real-world environment, the first video captured by a first camera located in the real-world environment having a first field of view;

defining a trip wire for performing video analytics at a first position of the first 2D scene shown in the first video, wherein the trip wire is defined based on a user input that draws a line over the first video and that at least partially defines a zone of interest in the first 2D scene of the real-world environment;

generating, based on processing the first video using a three-dimensional (3D) model generator, a 3D model of at least a portion of the real-world environment that is shown in the first 2D scene of the first video;

mapping, by the computing system, the trip wire from the first position of the first 2D scene shown in the first video to a first position of the 3D model that corresponds to the first position of the first 2D scene;

after the trip wire that is defined based on the user input over the first video is mapped from the first position of the first 2D scene shown in the first video to the first position of the 3D model, determining, by the computing system, that a second video that shows a second 2D scene of the real-world environment has become available, the second video captured by a second camera having the second field of view;

projecting the trip wire from the first position of the generated 3D model to a first position of the second 2D scene that corresponds to a same location in the real-world environment as the first position of the first 2D scene, wherein projecting the trip wire includes adjusting an angle and a length of the line that at least partially defined the zone of interest in the first 2D scene to define a corresponding zone of interest in the second 2D scene; and generating a user interface that includes the second 2D scene and the trip wire that has been projected to the first position of the second 2D scene, or performing video analytics on the second 2D scene using the trip wire that has been projected to the first position of the second 2D scene.

14. A system, comprising:

one or more processing devices; and one or more computer-readable media having instructions stored thereon that, when executed by the one or more processing devices, cause performance of operations comprising:

accessing, by a computing system, a first video that shows a first two-dimensional (2D) scene of a real-world environment, the first video captured by a first camera located in the real-world environment having a first field of view;

defining a trip wire for performing video analytics at a first position of the first 2D scene shown in the first video, wherein the trip wire is defined based on a user input that draws a line over the first video and that at least partially defines a zone of interest in the first 2D scene of the real-world environment;

generating, based on processing the first video using a three-dimensional (3D) model generator, a 3D model of at least a portion of the real-world environment that is shown in the first 2D scene of the first video;

mapping, by the computing system, the trip wire from the first position of the first 2D scene shown in the first video to a first position of the 3D model that corresponds to the first position of the first 2D scene;

after the trip wire that is defined based on the user input over the first video is mapped from the first position of the first 2D scene shown in the first video to the first position of the 3D model, determining, by the computing system, that a second video that shows a second 2D scene of the real-world environment has become available, the second video captured by a second camera having the second field of view;

projecting the trip wire from the first position of the generated 3D model to a first position of the second 2D scene that corresponds to a same location in the real-world environment as the first position of the first 2D scene, wherein projecting the trip wire includes adjusting an angle and a length of the line that at least partially defined the zone of interest in the first 2D scene to define a corresponding zone of interest in the second 2D scene; and generating a user interface that includes the second 2D scene and the trip wire that has been projected to the first position of the second 2D scene, or performing video analytics on the second 2D scene using the trip wire that has been projected to the first position of the second 2D scene.

15. The system of claim 14, wherein the defined trip wire is associated with one or more rules for performing video analytics.

16. The system of claim 15, wherein the one or more rules for performing video analytics comprise counting a number of objects crossing the trip line.

17. The system of claim 14, wherein the operations comprise determining that the first camera has moved and has a second field of view that is different from the first field of view.

18. The system of claim 17, wherein the first camera is at a fixed position in the environment and determining that the first camera has moved comprises determining that the first camera has one or more of (i) panned, (ii) tilted, and/or (iii) zoomed.

19. The system of claim 17, wherein the first camera is mobile and determining that the first camera has moved comprises determining translations and rotations of the video camera.

20. The system of claim 17, wherein determining that the first camera has moved comprises using one or more sensors to identify movement of the first camera.

* * * * *